(12) United States Patent
Xi et al.

(10) Patent No.: US 11,332,400 B2
(45) Date of Patent: ***May 17, 2022

(54) METHOD AND DEVICE FOR CONTROLLING POLLUTANTS IN METAL MINE WATER RESOURCES CYCLING UTILIZATION

(71) Applicant: CHINESE RESEARCH ACADEMY OF ENVIRONMENTAL SCIENCES, Beijing (CN)

(72) Inventors: Beidou Xi, Beijing (CN); Lei Wang, Beijing (CN); Yalei Zhang, Beijing (CN); Jinsheng Wang, Beijing (CN); Ming Chang, Beijing (CN); Yangyang Wang, Beijing (CN); Wenbing Tan, Beijing (CN); Tongtong Li, Beijing (CN); Hui Liu, Beijing (CN); Yali Zhang, Beijing (CN); Feng Wu, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 199 days.

This patent is subject to a terminal disclaimer.

(21) Appl. No.: 16/770,755

(22) PCT Filed: Dec. 12, 2018

(86) PCT No.: PCT/CN2018/120540
§ 371 (c)(1),
(2) Date: Jun. 8, 2020

(87) PCT Pub. No.: WO2019/114743
PCT Pub. Date: Jun. 20, 2019

(65) Prior Publication Data
US 2021/0171380 A1    Jun. 10, 2021

(30) Foreign Application Priority Data
Dec. 13, 2017 (CN) .......................... 201711332284.4

(51) Int. Cl.
*C02F 9/00* (2006.01)
*C02F 1/00* (2006.01)
(Continued)

(52) U.S. Cl.
CPC ................ *C02F 9/00* (2013.01); *C02F 1/006* (2013.01); *C02F 1/281* (2013.01); *C02F 1/283* (2013.01);
(Continued)

(58) Field of Classification Search
CPC .......... C02F 3/327; C02F 3/046; C02F 3/302; C02F 2103/06; C02F 3/10; C02F 3/286;
(Continued)

(56) References Cited

U.S. PATENT DOCUMENTS 4,997,568 A * 3/1991 Vandervelde ............. C02F 3/10
210/603
11,174,182 B2 * 11/2021 Wang ...................... C02F 3/327
(Continued)

FOREIGN PATENT DOCUMENTS

CN 102092855 A * 6/2011
CN 205011591 U * 2/2016

OTHER PUBLICATIONS

Liu et al, English machine translation CN 102092855, pp. 1-9 (Year: 2011).*
(Continued)

*Primary Examiner* — Claire A Norris
(74) *Attorney, Agent, or Firm* — CBM Patent Consulting, LLC

(57) ABSTRACT

It discloses to a device and a method for controlling pollutants in metal mine water resources cycling utilization. The
(Continued)

device includes a multi-stage inflow constructed wetland (3), in which one or more layers of the filler are laid, and water distribution pipes (4) are buried at different height levels in the filler layers for multi-stage inflow, so that the received basin water is allowed to flow through each layer of the filler to degrade or remove the pollutants. In the multi-stage inflow constructed wetland, the types of fillers, dosage ratio, particle size and filling height of fillers in each layer are specifically selected. Therefore, heavy metal adsorption, suspended matter filtration, organic matter degradation, dephosphorization and denitrification can be effectively realized in the multi-stage inflow constructed wetland.

9 Claims, 1 Drawing Sheet

(51) Int. Cl.
| | | |
|---|---|---|
| *C02F 1/28* | (2006.01) | |
| *C02F 3/28* | (2006.01) | |
| C02F 3/30 | (2006.01) | |
| C02F 3/32 | (2006.01) | |
| C02F 3/34 | (2006.01) | |
| C02F 101/10 | (2006.01) | |
| C02F 101/16 | (2006.01) | |
| C02F 101/20 | (2006.01) | |
| C02F 101/30 | (2006.01) | |
| C02F 103/10 | (2006.01) | |

(52) U.S. Cl.
CPC ............ *C02F 1/288* (2013.01); *C02F 3/2806* (2013.01); *C02F 3/301* (2013.01); *C02F 3/308* (2013.01); *C02F 3/327* (2013.01); *C02F 3/341* (2013.01); *C02F 2101/105* (2013.01); *C02F 2101/16* (2013.01); *C02F 2101/20* (2013.01); *C02F 2101/30* (2013.01); *C02F 2103/10* (2013.01); *C02F 2203/006* (2013.01); *C02F 2305/023* (2013.01)

(58) Field of Classification Search
CPC ...... C02F 3/2806; C02F 3/2826; C02F 3/306; C02F 3/32; C02F 3/34; C02F 1/42; C02F 2003/001; C02F 3/301; C02F 9/00
USPC .......... 210/602, 617, 170.08, 605, 290, 630, 210/170.01
See application file for complete search history.

(56) References Cited

U.S. PATENT DOCUMENTS

| | | | |
|---|---|---|---|
| 11,174,184 B2* | 11/2021 | Xi | C02F 9/00 |
| 11,230,485 B2* | 1/2022 | Xi | C02F 9/00 |
| 2009/0250393 A1* | 10/2009 | Williams | C02F 3/28 |
| | | | 210/602 |

OTHER PUBLICATIONS

Wang, English machine translation CN 205011591, pp. 1-4 (Year: 2016).*

* cited by examiner

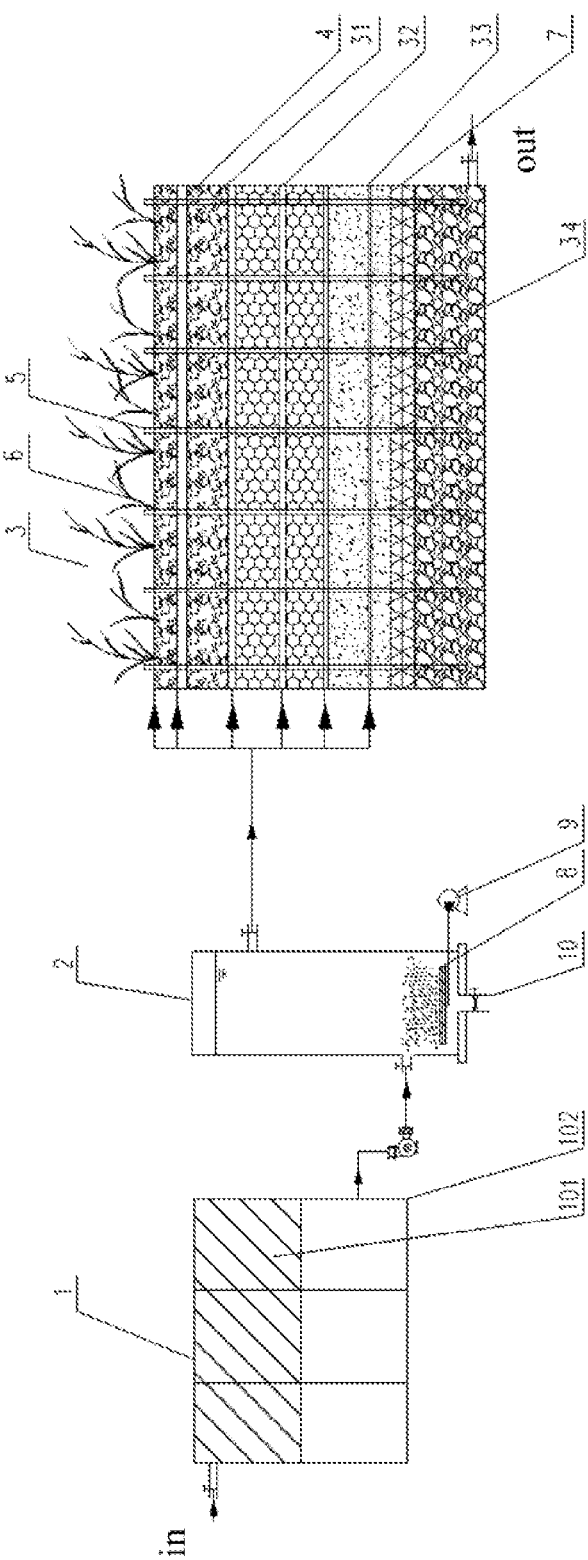

METHOD AND DEVICE FOR CONTROLLING POLLUTANTS IN METAL MINE WATER RESOURCES CYCLING UTILIZATION

TECHNICAL FIELD

The invention belongs to the field of water resources cycling utilization, and particularly relates to a device and a method for controlling pollutants in metal mine water resources cycling utilization.

BACKGROUND ART

Mine mining and industrial emissions have become the main pollution sources of heavy metals in farmland soil. Heavy metal pollution in the metal mining and surrounding soil has become one of serious environmental problems. Throughout the history of modern industrial and urban construction development at home and abroad, pollution is always the companion to industrial production, mine development, and urban construction. Especially during the period of rapid economic development, scientific planning, environmental protection policies, ecological awareness, prevention and control measures, and application of science and technology have not yet been fully put in place, and even serious disconnections in some areas have caused the expansion of heavy metals in the farmland soil. In this regard, effective implementation of source governance is the key link. Pollutions, such as tailings from mines in mountainous areas, are carried along with water to the plain agricultural fields, which pollutes the farmland. According to relevant data, the annual sewage discharge in the country is more than 6 billion tons. Excessive sewage irrigation will inevitably cause large-scale soil heavy metal pollution, which will obviously have adverse effects on agricultural production. Areas with dense economic activities and human activities around mines, near factories, around towns and on both sides of highways, are almost all polluted to varying degrees. and the surrounding farmland in the more economically developed areas presents a more serious trend of heavy metal pollution. Heavy metal pollution leads to the reduction of soil quality and the degradation of ecosystems, simultaneously pollutes crops and threatens human health. Therefore, in the water-scare areas of metal mining, the problem of excessive heavy metals should be focused on during water resources recycling, and the quality of water use and the control methods and technologies of heavy metals in water resource recycling should be improved.

Meanwhile, when heavy metal pollutants are carried along with basin water to the farmland, nitrogen and phosphorus content and suspended matters in basin water are increased due to the discharge of domestic sewage, heavy metal content and refractory organic pollutants are increased due to the industrial emissions. If the polluted water is directly discharged to the farmland without treatment, it may cause farmland compaction, malodor and affect the growth of crops.

Based on the above situation, it is necessary to develop a method and a device for controlling pollutants in metal mine water resources cycling utilization, so as to effectively solve the pollutants such as nitrogen, phosphorus, suspended matters, organic matter, especially heavy metals exceeding the standard during water resources recycling in the water-scare areas of the metal mining, avoid serious accumulation of heavy metals in plants endangering human health, maintain sustainable and healthy development of the agriculture, and ensure agricultural safety and human safety.

Contents of the Invention

In order to solve the above problems, the present inventors have conducted intensive studies, and provide a pollutant control device including a multi-stage inflow constructed wetland. Basin water to be treated is fed into the multi-stage inflow constructed wetland, and also into the multi-layered medium filler laid in the multi-stage inflow constructed wetland. Through the contact of the filler with water, heavy metals are adsorbed, suspended matters are filtered, organic matters are adsorbed and catalytically degraded, and microorganisms are added to denitrify and dephosphorize, thereby realizing basin water purification, causing heavy metal pollution meets the irrigation requirements, thereby completing the present invention.

The object of the present invention is to provide the following technical solutions:

(1) A device for controlling pollutants in metal mine water resources cycling utilization, wherein, the device includes a multi-stage inflow constructed wetland 3, in which one or more layers of the filler are laid, and water distribution pipes 4 are buried at different height levels in the filler layers for multi-stage inflow, so that the received basin water is allowed to flow through each layer of fillers to degrade or remove the pollutants.

(2) A method for controlling pollutants in metal mine water resources cycling utilization by using the control device according to (1), and the method includes:

providing the multi-stage inflow constructed wetland 3 at a set distance from basin revetment, feeding basin water into the multi-stage inflow constructed wetland 3, and also into one or more layers of fillers laid in the multi-stage inflow constructed wetland 3 through water distribution pipes 4 buried at different height levels to degrade or remove the pollutants.

According to the present invention, the device and the method for controlling pollutants in metal mine water resources cycling utilization have the following beneficial effects:

(1) In the present invention, the multi-stage inflow constructed wetland is constructed by laying multiple layers of fillers, and the types of fillers, dosage ratio, particle size and filling height of filler in each layer are specifically selected, thus heavy metal adsorption, suspended matter filtration, organic matter degradation, dephosphorization and denitrification, can be effectively realized in the multi-stage inflow constructed wetland.

(2) Water distribution pipes are buried at different heights in the filler layer of the multi-stage inflow constructed wetland, and the diameter of the water distribution pipes gradually decreases from top to bottom. The water distribution pipe is set according to the treatment capacity of the fillers at different heights, and the purification efficiency is significantly improved compared with single water distribution pipe.

(3) In the present invention, specific wetland plants are planted in the multi-stage inflow constructed wetland, which is beneficial to the enrichment of heavy metals, and the obtained wetland plants enriched with heavy metals can be reused to prepare functional biochar with photocatalytic effect.

(4) In the present invention, the pollutant control device also includes an A/O tank, which is directly connected to the multi-stage inflow constructed wetland. The A/O tank includes an anoxic tank and an aerobic tank connected in sequence, preferably is a three-stage A/O tank. Aquatic plants are treated under anoxic-aerobic-anoxic-aerobic-anoxic-aerobic environment, thereby the introduced aquatic plants can be greatly acidified and degraded into a carbon source with short carbon chains, and the nitrogen and phosphorus content of the introduced wetland plants or basin water can be greatly reduced in the presence of denitrification and dephosphorization bacteria.

(5) In the present invention, the pollutant control device may further include a nano-aeration tank, and the A/O tank is connected to the multi-stage inflow constructed wetland through the nano-aeration tank. Nano-bubble water is fed into the nano-aeration tank, which can generate oxygen free radicals to further degrade organic matters with long carbon chains.

DESCRIPTION OF FIGURES

FIG. 1 shows a schematic diagram of a device for controlling pollutants in metal mine water resources cycling utilization according to a preferred embodiment of the present invention.

DESCRIPTION OF THE REFERENCE SIGNS

1—A/O tank;
101—anoxic tank;
102—aerobic tank;
2—nano-aeration tank;
3—multi-stage inflow constructed wetland;
31—first layer of filler;
32—second layer of filler;
33—third layer of filler;
34—fourth layer of filler;
4—water distribution pipe;
5—airway tube;
6—wetland plant
7—polar polymer film
8—nano-aeration disk
9—nano-aerator
10—sludge discharge hole Specific Embodiments for Carrying Out the Invention The present invention will be described in more detail through preferred embodiments and examples. Through these descriptions, the features and advantages of the present invention will become clearer.

The term "exemplary" as used herein is intended to be "serving as an example, an illustrative embodiment, or an embodiment". Any of the embodiments described herein as "exemplary" need not be construed as preferred as or better than other embodiments. Although various aspects of the examples are shown in the FIGURES, unless specifically noted, the figures are not necessarily drawn to scale.

As shown in FIG. 1, the inventors conducted a lot of research, and provided a device for controlling pollutants in metal mine water resources cycling utilization to effectively control the pollutants, especially heavy metals, in water introduced into the farmland.

The device includes a multi-stage inflow constructed wetland 3, in which one or more layers of the filler are laid. Water distribution pipes 4 are buried at different height levels in the filler layers for multi-stage inflow, so that the received basin water is allowed to flow through each layer of fillers to degrade or remove the pollutants, such as organic matter degradation, heavy metal fixation and removal, suspended matter filtration, denitrification and dephosphorization.

In the present invention, the multi-stage inflow constructed wetland 3 is provided with three to six layers of fillers from top to bottom, and the filler of each layer may be selected from one or more of soil, biochar, functional biochar, ore particles such as gravel, natural zeolite, volcanic stone, calcite, limestone, pebbles, and so on, diatomaceous earth or Flory diatomaceous earth.

In a preferred embodiment, the multi-stage inflow constructed wetland 3 is provided with four layers of fillers from top to bottom:

the first layer of filler 31 is a mixed filler of soil and functional biochar, which adsorbs heavy metals and degrades organic matters;

the second layer of filler 32 is a mixed filler of soil, natural zeolite and limestone, which adsorbs and fixes heavy metals;

the third layer of filler 33 is a mixed filler of fly ash molecular sieve, Flory diatomaceous earth and biochar, which adsorbs heavy metals, and phosphorus-accumulating bacteria is added in this area to reduce the phosphorus content of basin water to be purified because of the phosphorus-accumulating ability;

the fourth layer of filler 34 is a mixed filler of pebbles and biochar, which adsorbs heavy metals, and phosphorus-accumulating bacteria is allowed to release phosphorus in this area by constructing an anaerobic environment, so its phosphorus-accumulation ability in the third layer of filler 15 is promoted. An anaerobic denitrifying bacteria is added to reduce the nitrogen content of basin water to be purified.

In the present invention, the area from the first layer of filler 31 to the third layer of filler 33 is an aerobic environment, the area of the fourth layer of filler 34 is an anaerobic environment. The water distribution pipe(s) 4 is(are) buried in the area from the first layer of filler 31 to the third layer, and the anaerobic environment is maintained in the fourth layer of filler 34. Preferably, the water distribution pipe 4 is bored PVC casing, and the diameter of the water distribution pipe 4 buried at different height levels in the filler layer gradually decreases from top to bottom, therefore the flow rate of the introduced basin water decreases from top to bottom. Because the height of the filler in the filler layer decreases from top to bottom, large-flow water is carried by the pipe with thick-diameter and is purified through a long-path filler, and small-flow water is carried by the pipe with thin-diameter and is purified through a short-path filler. In addition to meeting purification requirements, the purification efficiency of the multi-layer purification is obviously higher than that of the single pipe water distribution. Meanwhile, the water distribution pipe 4 made of PVC material is hard, stable with respect to organic acids, inorganic acids, alkalis and salts, and thus it has long service life in the water treatment environment, which is suitable for multi-stage inflow constructed wetland 3.

In a preferred embodiment, a plurality of airway tubes 5 with vent holes on the wall are longitudinally inserted in the multi-stage inflow constructed wetland 3. The airway tube 5 is inserted into the area from the first layer of filler 31 to the third layer of filler 33 to allow gas exchange between the inside of the filler layer and the outside thereof. Oxygen-containing gas is introduced into the area from the first layer of filler 31 to the third layer of filler 33 through the airway tube 5, which is beneficial to the life activities of aerobic bacteria.

In another preferred embodiment, the airway tube 5 is inserted into the area of the fourth layer of filler 34, and the anaerobic environment in the fourth layer of filler 34 should not be changed by the number of inserted airway tube 5. The airway tube 5 is useful for the flow of gas inside and outside the filler, such as the flow of oxygen in the area from the first layer of filler 31 to the third layer of filler 33, or the discharge of nitrogen generated in the area of the fourth layer of filler 34 by denitrification.

In a preferred embodiment, the multi-stage inflow constructed wetland 3 is provided with a colorless transparent cover.

In the present invention, the first layer of filler 31 is laid at 0-500 cm, and the first layer of filler 31 is a mixed filler of soil and functional biochar, and the mixing ratio is 3:(6~8), and preferably 3:7.

Wherein, biochar is a material with high-carbon-content obtained from biomass after high temperature treating and deoiling under anoxic conditions. Functional biochar is biochar loaded with transition metals:

(1) In term of microstructure, it has characteristics of porosity. The large pores can ensure the aeration and water retention capacity of the soil used with it, and also provide a place for microorganisms to survive and reproduce, thereby improving the activity and reproduction rate of the microorganisms; micropores and small pores affect the adsorption and transfer of molecules by biochar, and the pore structure of biochar can reduce the rate of water penetration and enhance the adsorption capacity of soil for nutrients that are highly mobile and easily leached; therefore, its porous structure is conducive to the growth of wetland plants 6 on the first layer of filler 31.

(2) The porosity of biochar determines its large surface area, and a large amount of organic matters in the regional water can be adsorbed, which is conducive to the degradation of organic matters after adsorption.

(3) The surface of the biochar has carboxyl, phenolic hydroxyl, and carbonyl oxygen-containing functional groups. The biochar has higher cation exchange capacity because of negative surface charges generated by the above functional groups, and thus can effectively adsorb heavy metal ions in basin water.

(4) In addition to the above-mentioned characteristics of biochar, functional biochar is loaded with transition metals (such as nickel, cobalt and iron), therefore water molecules or hydroxides adsorbed on the surface of functional biochar are oxidized in the presence of oxygen through the photocatalysis of transition metals to generate active oxygen such as hydroxyl radical (.OH), and thus organic pollutants are degraded, desulfurized (S), and dechlorinated (Cl), thereby reducing their toxicity and odor. Meanwhile, the dissolved metal ions are reduced to insoluble metal atoms by the loaded transition metal through the electrochemical oxidation-reduction reaction and catalysis, and then are plated on the surface of the functional biochar medium to achieve heavy metal removal.

In the present invention, the first layer of filler 31 is mainly composed of functional biochar, and the soil is added as an auxiliary, which is beneficial to the planting of the plants on the first layer of filler 31. After experiments, it was found that when the soil and the functional biochar were mixed with a weight ratio of 3:(6~8), good growth of plants could be achieved due to the fixation of the activated carbon to the soil, and a large amount of organic matters can be absorbed by the filler with the functional biochar as main part, then be effectively degraded through the photocatalysis of transition metal ions. If the weight ratio of soil to functional biochar is less than 3:8, namely the ratio of soil decreases, plant growth is affected due to lack of necessary nutrients. If the weight ratio of soil to functional biochar is more than 3:6, the effects of photocatalysis and electrochemical oxidation-reduction reaction are reduced, therefore the degradation efficiency of organic matters and the adsorption of heavy metal decreases.

In a further preferred embodiment, the particle size of the filler in the first layer of filler 31, especially of the functional biochar, is 0.10-0.30 cm. Within this particle size range, the support of functional biochar to the soil is beneficial for air to enter the filler layer, and the plant roots are effectively contacted with air, which is beneficial to the growth of aquatic plants planted on the first layer of filler 31. The functional biochar located in the lower part of the water body undergoes photocatalytic reaction in the presence of oxygen to achieve effective degradation. If the particle size of the functional biochar is less than 0.10 cm, it is unfavorable for air to enter the filler layer, and is also unfavorable for plant growth and degradation of organic pollutants because of the lack of oxygen. If the particle size of the functional biochar is greater than 0.30 cm, the larger particle size is not conducive to the efficiency of photocatalytic and electrochemical oxidation-reduction reaction due to the smaller surface area.

In a further preferred embodiment, wetland plants 6, preferably Siberian iris and canna, are planted on the first layer of filler 31. Siberian iris and canna can grow normally in eutrophic water bodies, showing good water purification effects. The values of total nitrogen, total phosphorus, and chemical oxygen demand (COD) in water can be effectively reduced through plant absorption, volatilization, root filtration, degradation, stabilization and so on. Siberian iris and canna show extremely high enrichment capacity for heavy metals, and the accumulation of heavy metals in the two plants is more than 100 times that of ordinary aquatic plants, while their normal growth is not affected. Heavy metals can be completely removed from the water body by harvesting plants. Therefore, these two aquatic plants are selected for planting, which is an effective ecological method for reducing heavy metals.

In the present invention, the functional biochar in the multi-stage inflow constructed wetland 3 is prepared by using heavy metal-rich biomass. In an embodiment, functional biochar can be obtained by carbonizing, activating, deoiling, reducing and drying the wetland plants 6 (Siberian iris and canna) grown in multi-stage inflow constructed wetland 3.

In another embodiment, the wetland plants 6 (such as canna and Siberian iris) with heavy metal enrichment function are cultured in the culture solution with high content of heavy metal. Wherein, the culture solution contains copper chloride, zinc chloride and nickel chloride, with a molar ratio of copper chloride:zinc chloride:nickel chloride=32:9:9. The obtained wetland plants 6 are enriched with copper, zinc and nickel, and then are carbonized at 900-1600° C., activated by zinc chloride to deoil, reduced by sodium borohydride and dried to obtain functional biochar.

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode, and biochar has higher electric capacity and photocatalytic ability.

In a preferred embodiment, rhamnolipid, aspartic acid or polyaspartic acid or a combination thereof, preferably the combination of rhamnolipid and aspartic acid, is added into the multi-stage inflow constructed wetland 3 during the growth process of wetland plants 6, to promote the enrichment of heavy metals in plants, so that the concentration of heavy metals in the plant could be as high as possible. Rhamnolipid and (poly)aspartic acid have good biocompatibility and biodegradability. As water-soluble biosurfactant, rhamnolipid can promote the dissolution of heavy metals adsorbed by soil, etc. through emulsification and solubilization, which is beneficial to plant absorption. (Poly)aspartic acid can chelate and activate heavy metal ions, thus can dissolve the heavy metals adsorbed by soil and so on, and at the same time, it also can effectively promote plant growth, which is different from other chelating agents. By using rhamnolipid and (poly)aspartic acid mixed in a set ratio, heavy metals can effectively enriched by the plants.

Preferably, the concentration of rhamnolipid in basin water to be treated is 1-20 mg/L, and the concentration of (poly)aspartic acid in basin water to be treated is 1-25 mg/L.

In a preferred embodiment of the present invention, the second layer of filler 32 is laid at 500-1000 cm, and the second layer of filler 32 is a mixed filler of soil, natural zeolite and limestone, with the mixing ratio of 1:(2~3):(0.5~1), and preferably 1:2:0.5.

Zeolite is the general term of water-containing porous aluminosilicate, and its crystal is mainly composed of (SiO) tetrahedron. The overall framework of the zeolite molecule is formed by $Al^{3+}$ and $Si^{4+}$ as framework ions and oxygen atoms together, and part of $Si^{4+}$ is replaced by $Al^{3+}$, resulting in excess negative charge. At the same time, there are cavities and channels in the zeolite framework with certain pore size, which determines its adsorption and ion exchange properties. Its adsorption of ammonia nitrogen and the adsorption and fixation of heavy metals have greater advantage than other ore raw materials.

Limestone also has more pore structures, so it can effectively adsorb heavy metals. At the same time, the acidity and alkalinity of water can be effectively regulated by limestone, and it play an important role in the growth of plants in the upper filler and the reproduction of microorganisms in water (phosphorus-accumulating bacteria multiply at pH 5~pH 9, and nitrifying bacteria and denitrifying bacteria multiply at pH 6.0~pH 8.5). Meanwhile, limestone can strongly absorb fluoride ions, which effectively reducing the content of fluorine in water.

The soil also provides support for wetland plants 6 in constructed wetlands. At the same time, studies have shown that due to the presence of clay minerals, oxides and soil organic matters in the soil, the soil has a tendency to enrich heavy metals, making its ability to adsorb heavy metal ions not to be underestimated.

After a lot of experimental research, the mixing ratio of the soil, natural zeolite and limestone in the second layer of filler 32 is 1:(2~3):(0.5~1), within this range, the adsorption and fixation of most heavy metals and the adjustment of the pH value of water can be realized. If the proportion of soil increases, the adsorption capacity of heavy metals decreases due to the weaker adsorption effect of soil to heavy metals than those of natural zeolite and limestone; on the contrary, nutrient reserves of plant growth may be affected. If the proportion of the natural zeolite increases, the adsorption of heavy metals increases, and correspondingly the amount of soil or limestone decreases, which also has a threat to plant growth or the regulation of the pH value of water. Similarly, the increase of the proportion of limestone is beneficial to the adjustment of the pH value of water, but the effect of other components is reduced accordingly; on the contrary, the pH value of water cannot be adjusted quickly and effectively, thereby affecting the functional activities of microorganisms.

In a further preferred embodiment, the particle size of the filler in the second layer of filler 32 is 0.08-0.1 cm, which is equal to or lower than that of the functional biochar in the first layer of filler 31, and is equal to or higher than the particle size in the third layer of filler 33. This particle size range is chosen under considering the coordination of gas circulation and total metal adsorption. When the particle size is less than 0.08 cm, although the adsorption of heavy metals is promoted, it is not beneficial to the phosphorus accumulation of the phosphorus-accumulating bacteria placed in the third layer of filler 33 due to increased packing density and poor air circulation. When the particle size is higher than 0.1 cm, air circulation is promoted, but corresponding heavy metal adsorption capacity is significantly reduced compared to that with particle size of 0.08 cm.

In a preferred embodiment of the present invention, the third layer of filler 33 is laid at 1000~1500 cm, and the third layer of filler 33 is a mixed filler of fly ash molecular sieve, Flory diatomaceous earth and biochar with the mixing ratio of 1:(3~4):(1~1.5), and preferably 1:3:1.

In the present invention, three kinds of porous fillers, namely fly ash molecular sieve, Flory diatomaceous earth and biochar are used to adsorb heavy metals in the deep layer of the multi-stage inflow constructed wetland. The common feature of the three is the high porosity, which is convenient for the biofilm formation of microorganisms. Wherein, fly ash is used as a molecular sieve, based on the fact that the main components of fly ash are similar to those of molecular sieves. Fly ash is currently treated as waste, because it contains heavy metal ions, such as Cr, Hg, As and Pb, and will pollute air, water, soil and so on. If fly ash is used as molecular sieve, its cation exchange characteristics and pore structure are beneficial to achieve the adsorption of heavy metals, thereby the source of pollution is used effectively.

Biochar with large surface area also has excellent heavy metal adsorption capacity.

Compared with ordinary diatomaceous earth, Flory diatomaceous earth has larger pore volume, larger specific surface area, and stronger adsorption of heavy metals and organic pollutants. In particular, Flory diatomaceous earth has a depth effect, that is, in deep filtration, the separation process only occurs in the "inside" of the medium, and some of the relatively small impurity particles that pass through the surface of Flory diatomaceous earth are blocked by the tortuous micropore structure and the finer pores inside diatomaceous earth. When the particles hit the wall of the channel, it is possible to escape from the flow. The nature of Flory diatomaceous earth is beneficial to the long-term retention of bacterial microorganisms in this area, which facilitates the placement of microorganisms.

Since the fly ash molecular sieve, Flory diatomaceous earth and biochar have different adsorption advantages for different heavy metals, the mixing ratio of fly ash molecular sieve, Flory diatomaceous earth and biochar is 1:(3~4):(1~1.5), which is beneficial to the placement of microorganisms, thereby improving the adsorption of various heavy metal ions.

In a preferred embodiment, the particle sizes of fly ash molecular sieve, Flory diatomaceous earth and biochar are 0.05-0.08 cm. Due to the high porosity of the above three fillers, within this small particle size range, it is beneficial to the adsorption of heavy metal ions and the biofilm formation of microorganisms.

In a preferred embodiment, phosphorus-accumulating bacteria is added in the third layer of filler 33 to reduce the phosphorus content of basin water to be purified. Said phosphorus-accumulating bacteria is selected from one or more of *Acinetobacter, Aeromonas* and *Pseudomonas*, and preferably *pseudomona alcaligenes*.

Under aerobic conditions, free oxygen is used as the electron acceptor by phosphorus-accumulating bacteria to oxidize β-hydroxy butyric acid (PHB) stored in cells, and the energy generated by this reaction is used to excessively take up phosphate from water to synthesize the high-energy substance adenosine triphosphate (ATP), wherein a part of which is provided for bacterial synthesis and life-sustaining activities, and another part of which is used to synthesize polyphosphate which accumulating in bacterial cells. Under anaerobic conditions, the phosphorus-accumulating bacteria decompose the polyphosphate in the body and produce ATP. Phosphorus is released by the phosphorus-accumulating bacteria under anaerobic conditions. The amount of aerobic phosphorus accumulating is greater than that of anaerobic phosphorus releasing, thus the phosphorus content of basin water can be effectively controlled by inputting the phosphorus-accumulating bacteria.

In a preferred embodiment of the present invention, the fourth layer of filler 34 is laid at 1500~2000 cm, the fourth layer of filler 34 is a mixed filler of pebbles and biochar with the mixing weight ratio of 1:(1~2), and preferably 1:1. Pebbles also have the ability to adsorb heavy metals, and are cooperated with biochar to synergistically adsorb heavy metals.

In a further preferred embodiment, the particle size of the filler in the fourth layer of filler 34 is 0.30-0.50 cm. Larger gaps will be formed between the fillers due to their larger particle size, which facilitates the circulation of the introduced microorganisms. Because the particle size of the filler in the third layer of filler 33 is relatively small, the microorganisms are restricted to enter the fourth layer of filler 34 to a certain extent. If the particle size of the filler in the fourth layer of filler 34 is also reduced, the phosphorus-accumulating bacteria cannot effectively travel to and from the third and fourth layers of filler, which is not beneficial to the process of phosphorus-accumulating and -releasing.

In a further preferred embodiment, the fourth layer of filler 34 is an anoxic or anaerobic environment, and anaerobic denitrifying bacteria, preferably heterotrophic anaerobic denitrifying bacteria, are added to the fourth layer of filler 34. $NO_3^-$ can be gradually converted to $NO_2^-$, NO, $N_2O$ and $N_2$ by the denitrifying bacteria, and gets out of the water system, thereby achieving the purpose of denitrification. Although certain nitrifying bacteria and denitrifying bacteria are present in basin water, some denitrifying bacteria are added in basin water in present invention to further improve the denitrification efficiency.

In a further preferred embodiment, phosphorus-accumulating bacteria is added to the fourth layer of filler 34. Phosphorus is released by the phosphorus-accumulating bacteria under anaerobic conditions, and the phosphorus releasing under this condition will promote better phosphorus accumulation under aerobic conditions in the third layer of filler.

In order to achieve and maintain the anaerobic or anaerobic environment in the fourth layer of filler 34, a polar polymer film, such as polyaniline film, is filled between the third layer of filler 33 and the fourth layer of filler 34. The polar polymer polyaniline film 7 has unique functions of water permeability and air impermeability. Therefore, water and microorganisms are allowed to circulate between the third layer of filler 33 and the fourth layer of filler 34, while the upper layer of oxygen-containing gas is prevented from entering the fourth layer of filler 34, thereby the life activities of anaerobic denitrifying bacteria and phosphorus-accumulating bacteria in this area can be ensured.

Appropriate amount of phosphorus and nitrogen fertilizers are required for the growth of plants. The phosphorus in the phosphorus fertilizer and the nitrogen in the nitrogen fertilizer are absorbed by the plants in the form of acid radical ions. However, only part of the fertilizer applied to the soil each year is absorbed by the crops of the season, and the rest is fixed by the soil to form large amount of acidic salt deposits, causing soil compaction. Basin Water may be rich in nitrogen and phosphorus, and both exist in the form of organic phosphorus and organic nitrogen, or inorganic phosphorus and inorganic nitrogen. Organic phosphorus and organic nitrogen are decomposed into inorganic phosphorus, inorganic nitrogen and short carbon chains in the multi-stage inflow constructed wetland 3. The formed inorganic phosphorus and inorganic nitrogen mostly exist in water in the form of acid radical ions. Once the contents of nitrogen and phosphorus exceed the plant's requirements, the soil condition will definitely be affected, and acidic salt deposition and soil compaction will also occur. Therefore, after extensive research, the aerobic zone (the first, second and third layers of filler zone) and anaerobic zone (the fourth layer of filler zone) are set up in the multi-stage inflow constructed wetland 3, and phosphorus-accumulating bacteria and denitrifying bacteria are add, thereby effectively solving the problem of excessive nitrogen and phosphorus.

The thicknesses of the first layer of filler 31, the second layer of filler 32, the third layer of filler 33 and the fourth layer of filler 34 are all 500 cm, and the total thickness of the fillers is 2000 cm; and said thickness is the most preferable to effectively implement the function of each filler layer. The thickness of the first layer of filler 13 is from 100 to 700 cm, the thickness of the second layer of filler 14 is from 300 to 700 cm, the thickness of the third layer of filler 15 is from 200 to 600 cm, and the thickness of the fourth layer of filler 16 is from 100 to 600 cm.

In the present invention, the multi-stage inflow constructed wetland 3 is provided with a water inlet and a water outlet on both sides along its length. Water is fed to the water distribution pipe 4 into the filler layer through the water inlet, and the water outlet is located at the bottom of the multi-stage inflow constructed wetland 3 to collect water from the fourth layer of filler 34. The valves of the water inlet and the water outlet are opened at the same time, and the constructed wetland is in the vertical downflow operation mode. The contact area of water and air can be greatly increased in the vertical downflow operating mode, which is beneficial to the transmission of oxygen and the purification effect of nitrogen and phosphorus is improved. Moreover, water flows vertically from the top to the bottom of the filler bed, and passes through different media layers in sequence during the flow process, thereby achieving the purification of heavy metals and suspended matters.

Preferably, the bottom of the multi-stage inflow constructed wetland 3 (that is, the bottom of the fourth layer of filler 34) is provided with a slope with i=0.1-0.5, so that the water purified by the filler layer is collected to the water outlet along the slope to ensure the smooth flow of treated water.

In the present invention, phosphorus-accumulating bacteria and denitrifying bacteria were introduced into the multi-stage inflow constructed wetland 3. A carbon source is required with the growth of microorganisms, especially short chain carbon source is more convenient for the absorption and utilization of microorganisms. However, there are fewer short chain organic matters in basin water, and the growth and reproduction of microorganisms placed in the multi-stage inflow constructed wetland 3 are bound to be affected.

Therefore, the pollutant control device in the present invention further includes an A/O tank 1 that provides organic matters with short chain carbon to the multi-stage inflow constructed wetland 3, and the A/O tank 1 includes an anoxic tank 101 and an aerobic tank 102 connected in sequence. Aquatic plants, such as duckweed and algae, are added to the anoxic tank 101 with basin water for acidification and digestion, and then fed into the aerobic tank 102 to degrade organic matters after acidification in an aerobic environment. On the premise of meeting the standards of organic matter in irrigation water, aquatic plants are acidified and degraded into organic matters with short carbon chains in A/O tank 1, to provide the microorganisms in the multi-stage inflow constructed wetland 3 with the carbon source for reproduction, which is conducive to the removal of nitrogen, phosphorus and organic matters with long carbon chains in basin water.

In a further preferred embodiment, denitrifying bacteria, nitrifying bacteria, and phosphorus-accumulating bacteria are added to the A/O tank 1, and organic matters and nitrate are used by the denitrifying bacteria in the anoxic tank 101 for denitrification to reduce the nitrogen content of the system. In the anoxic tank 101 and the aerobic tank 102, the dissolved phosphorus in the environment is actively absorbed by the phosphorus-accumulating bacteria and stored in the body in the form of phosphorus to reduce the phosphorus content of the system. In the aerobic tank 102, ammonia nitrogen is oxidized by nitrifying bacteria to form nitrite and nitrate, which increases the nitrogen nutrition available to plants and can reduce the nitrogen content of basin water through subsequent anaerobic denitrification.

In a further preferred embodiment, the A/O tank 1 includes three groups of anoxic tanks 101 and three groups of aerobic tanks 102, wherein the anoxic tank 101 and the aerobic tank 102 are connected, and the two anoxic tanks 101 is connected through the aerobic tank 102, and the two aerobic tanks 102 are connected through the anoxic tank 101, that is, the A/O tank 1 is a three-stage A/O tank. Through the alternating environment of anoxic-aerobic-anoxic-aerobic-anoxic-aerobic in the three-stage A/O tank, the introduced aquatic plants can be greatly acidified and degraded into a carbon source with short carbon chains, and the nitrogen and phosphorus content in the introduced wetland plants 6 or basin water is greatly reduced under the premise of the presence of denitrification and dephosphorization bacteria.

Denitrification and dephosphorization can be achieved in the multi-stage inflow constructed wetland 3 by the combined action of the denitrifying bacteria and phosphorus-accumulating bacteria added in the multi-stage inflow constructed wetland 3, and the denitrifying bacteria, nitrifying bacteria and phosphorus-accumulating bacteria added in the A/O tank 1, thereby further reducing the nitrogen and phosphorus content of basin water and reaching the irrigation level.

In a preferred embodiment, if aquatic plants, such as duckweed and algae, are acidified and digested as raw materials for bacterial growth nutrients in the A/O tank 1, the anoxic tank 101 of the A/O tank 1 should be equipped with an agitator, so that duckweed or algae can be crushed to speed up the acidification and digestion process.

In a preferred embodiment, when the COD of the supernatant of the A/O tank 1 is higher than 200 mg/L, it is considered that the degree of decomposition of duckweed and algae in the A/O tank 1 is good.

In the present invention, the A/O tank 1 and the multi-stage inflow constructed wetland 3 can be directly connected, and the supernatant in the A/O tank 1 is transported to the multi-stage inflow constructed wetland 3. Moreover, the A/O tank 1 and the multi-stage inflow constructed wetland 3 can be connected through the nano-aeration tank 2, wherein the supernatant in the A/O tank 1 is fed to the nano-aeration tank 2 for the degradation of organic matter, and then the treated supernatant is fed to the multi-stage inflow constructed wetland 3.

In the present invention, a nano-aeration disk 8 is set at the lower part of the nano-aeration tank 2 and/or the aerobic tank 102 of the A/O tank 1, and an oxygen-containing fluid is introduced through the nano-aeration disk 8 into the nano-aeration tank 2 and the aerobic tank 102. Furthermore, the oxygen-containing fluid is nano-bubble water or the aqueous solution containing tiny bubbles with a size of 100~500 nm, and dissolved oxygen amount of 10~25 mg/L.

Due to the small size and the large specific surface area of the bubbles in the nano-bubble water, they can show characteristics different from ordinary bubbles. For example, the residence time of the bubbles in the device is long due to their small volume. When the bubbles slow rise, both the zeta potential and the specific surface area increase (when ordinary bubbles rise, their volume increases and their specific surface area decreases; while the specific surface area of nano-bubbles increases during they rise, due to a self-pressurizing effect of the internal gas of nano-bubbles because of the surface tension). Active oxygen radicals, such as hydroxyl radicals are generated after the bubbles collapse, thereby efficiently degrading organic matters with long carbon chains in water; and the high temperature generated at the moment of collapse is also conducive to the degradation of organic matters with long carbon chains.

In a preferred embodiment, the pore diameter on the nano-aeration disk 8 is a nano-aperture, and it can be set to further ensure the oxygen entering the nano-aeration tank 2 to be nano-sized bubbles. The nano-aeration disk 8 is connected to a flowmeter and a nano-aerator 9 in sequence through a pipeline. The oxygen-containing fluid is supplied through the nano-aerator 9 to the nano-aeration disk 8, and the flow rate (or the amount of oxygen) of the oxygen-containing fluid feeding into the nano-aeration tank 2 can be effectively controlled by the flowmeter.

In a preferred embodiment, a secondary sludge discharge hole 10 is set at the bottom of the nano-aeration tank 2 to further remove the sludge brought by basin water, thereby avoiding blocking the pipeline when it is transported to the multi-stage inflow constructed wetland 3, and avoiding blocking the pore of the filler in the multi-stage inflow constructed wetland 3.

In a preferred embodiment, organic matters with long carbon chains can be effectively degraded in the nano-aeration tank 2, so that the average molecular weight of organic matters in water from the nano-aeration tank 2 is lower than 308.24 Da, and preferably lower than 254.50 Da.

In a preferred embodiment, microorganisms are added in the nano-aeration tank 2, and said microorganism is *Delftia* sp., which belongs to the genus *delftia*. Organic matters with long carbon chains are used as the carbon source by the bacteria of *Delftia* sp. for growth, so the addition of *Delftia* sp. can promote the degradation of organic matters with long carbon chains. This genus belongs to aerobic denitrifying bacteria with strong adaptability, fast growth rate, high yield, and fast and thorough denitrification, thus has important application value in environmental pollution control and bioremediation.

Another object of the present invention is to provide a method for controlling pollutants in metal mine water resources cycling utilization, so as to effectively control the content of pollutants in water introduced into the farmland through the above control device. The method includes constructing the multi-stage inflow constructed wetland 3 at a set distance from the basin revetment, feeding basin water into the multi-stage inflow constructed wetland 3, and also into one or more layers of fillers laid in the multi-stage inflow constructed wetland 3 through the water distribution pipe 4 buried at different height levels to degrade or remove the pollutants, such as organic matter degradation, heavy metal fixation and removal, suspended matter filtration, denitrification and dephosphorization. Treated basin water meets the requirements of farmland irrigation water quality, and then is fed to the farmland for irrigation.

In the present invention, the multi-stage inflow constructed wetland 3 is provided with four layers of fillers from top to bottom:

the first layer of filler 31 adsorbs heavy metals and degrades organic matters;

the second layer of filler 32 adsorbs and fixes heavy metals;

the third layer of filler 33 adsorbs heavy metals, and phosphorus-accumulating bacteria is added in this area to reduce the phosphorus content of basin water to be purified because of the phosphorus-accumulating ability;

the fourth layer of filler 34 adsorbs heavy metals, and phosphorus-accumulating bacteria is allowed to dephosphorize in this area by constructing an anaerobic environment, so its phosphorus-accumulation ability in the third layer of filler 33 is promoted. An anaerobic denitrifying bacteria is added to reduce the nitrogen content of basin water to be purified.

Specifically, the first layer of filler 31 is a mixed filler of soil and functional biochar. The mixing ratio is 3:(6~8), and preferably 3:7, the particle size of the filler is 0.10-0.30 cm, and the thickness of the filler is from 100 to 700 cm.

The second layer of filler 32 is a mixed filler of soil, natural zeolite and limestone. The mixing ratio is 1:(2~3):(0.5~1), and preferably 1:2:0.5, the particle size of the filler is 0.08-0.1 cm, and the thickness of the filler is from 300 to 700 cm.

The third layer of filler 33 is a mixed filler of fly ash molecular sieve, Flory diatomaceous earth and biochar. The mixing ratio is 1:(3~4):(1~1.5), and preferably 1:3:1, the particle size of the filler is 0.05-0.08 cm, and the thickness of the filler is from 200 to 600 cm.

The fourth layer of filler 34 is a mixed filler of pebbles and biochar. The mixing ratio is 1:(1~2), and preferably 1:1, the particle size of the filler is 0.30-0.50 cm, and the thickness of the filler is from 100 to 600 cm.

In the present invention, the ratio of different materials in each filler layer is based on the weight thereof.

In a preferred embodiment, wetland plants 6 are planted on the multi-stage inflow constructed wetland 3 (on the first layer of filler 31), and said wetland plants 6 are Siberian iris and canna. Preferably, rhamnolipid or (poly)aspartic acid or a combination thereof, preferably the combination of rhamnolipid and (poly)aspartic acid, is added into the multi-stage inflow constructed wetland 3 during the growth process of wetland plants 6, to promote the enrichment of heavy metals in plants, so that the heavy metals in the plant can reach high concentration that the plant can withstand.

In a preferred embodiment, a polar polymer film 7, such as polyaniline film, is filled between the third layer of filler 33 and the fourth layer of filler 34. Phosphorus-accumulating bacteria is added to the third layer of filler 33, and denitrifying bacteria and phosphorus-accumulating bacteria are added to the fourth layer of filler 34.

In a preferred embodiment, an A/O tank 1 is built to connect with the multi-stage inflow constructed wetland 3. Basin water and aquatic plants, such as duckweed and algae, are added in the anoxic tank 101 of the A/O tank 1 to acidify and digest in the anoxic environment, and then fed into the aerobic tank 102 to degrade organic matters after acidification in the aerobic environment. The treated supernatant is transported to the multi-stage inflow constructed wetland 3, where the supernatant from the A/O tank 1 is mixed with the introduced basin water and is purified.

In another preferred embodiment, an A/O tank 1 and a nano-aeration tank 2 are built to connect with the multi-stage inflow constructed wetland 3, wherein, the A/O tank 1, the nano-aeration tank 2 and the multi-stage inflow constructed wetland 3 are connected in sequence.

Basin water and aquatic plants, such as duckweed and algae, are added in the anoxic tank 101 of the A/O tank 1 to acidify and digest in the anoxic environment, and then fed into the aerobic tank 102 to degrade organic matters after acidification in the aerobic environment, thereafter the treated supernatant is transported to the nano-aeration tank 2.

The supernatant in the A/O tank 1 is received by the nano-aeration tank 2 and treated in an aerobic environment, such as, organic matter degradation, suspended matter sedimentation, denitrification and dephosphorization, and then the treated supernatant is fed to the multi-stage inflow constructed wetland 3.

The supernatant from the nano-aeration tank 2 is mixed with basin water and fed into the multi-stage inflow constructed wetland 3 to degrade or remove pollutant.

In a preferred embodiment, when the COD of the supernatant of the A/O tank 1 is higher than 200 mg/L, it is considered that the degree of decomposition of duckweed and algae in the A/O tank 1 is good, and the high level of organic matters are obtained.

In the present invention, a nano-aeration disk 8 is set at the lower part of the nano-aeration tank 2 and/or the aerobic tank 102 of the A/O tank 1, and an oxygen-containing fluid is introduced through the nano-aeration disk 8 into the nano-aeration tank 2 and the aerobic tank 102. Furthermore, the oxygen-containing fluid is nano-bubble water or the aqueous solution containing tiny bubbles with a size of 100~500 nm, and dissolved oxygen amount of 10~25 mg/L.

In the present invention, in addition to constructing the device including the A/O tank 1, the nano-aeration tank 2 and the multi-stage inflow constructed wetland 3, basin water in the river is also pre-treated by adding denitrifying bacteria, and preferably aerobic denitrifying bacteria, such as *Alicaligenes faecalis* or *Thiosphaera pantotropha*.

Preferably, the concentration of denitrifying bacteria in basin water of the river is 5~100 billion/g. It only needs to be inoculated once when basin water is used for irrigation. Basin water to be treated will inevitably be further purified by the addition of denitrifying bacteria, especially aerobic denitrifying bacteria. Meanwhile, the synergistic effect of aerobic denitrifying bacteria and anaerobic denitrifying bacteria added in the multi-stage inflow constructed wetland will promote water purification In the present invention, wetland plants such as Siberian iris and canna, planted in the multi-stage inflow constructed wetland 3, has extremely excellent enrichment effect on heavy metals, so can be used to prepare functional biochar, which may be used as a filler for the multi-stage inflow constructed wetland.

In another embodiment, the wetland plants 6 (such as canna and Siberian iris) with heavy metal enrichment function are cultured in the culture solution with high-content heavy metal. Wherein, the culture solution contains copper chloride, zinc chloride, and nickel chloride, with a molar ratio of copper chloride:zinc chloride:nickel chloride=32:9:9, and then the wetland plants 6 enriched with copper, zinc and nickel are obtained.

In a preferred embodiment of the present invention, the preparation of functional biochar includes the following steps:

step 1, crushing the plants and carbonizing to obtain activated carbon;

step 2, activating the activated carbon to obtain activated carbon after activation;

step 3, reducing the activated carbon after activation to obtain functional biochar.

In step 1, the whole plant is crushed to particles with a length of 3-5 mm as needed.

Argon is filled in a heating vessel, such as a tube muffle furnace, to obtain an inert environment. After a set temperature is reached in the heating vessel, in which the crushed plant particles are fed, thereafter the set temperature is maintained for 120 min, and then the temperature is reduced from the set temperature to 20° C. within 200 min, thereby carbonizing the biomass. Wherein, the set temperature is 900-1600° C.

In step 2, the activated carbon is washed with distilled water until the water is clear after washing. In order to activate, 30-50 wt. % zinc chloride is added to the washed activated carbon until the liquid level is higher than the activated carbon, and the mixture is stirred, microwave radiated for a set time, and then soaked at 25° C. overnight. The activated carbon after activation is washed to neutral, dried and ready for use.

Bio-oil produced by carbonization in step 1 is detached from the internal pores of the activated carbon through the activation, thereby preventing bio-oil from clogging the internal pores of the activated carbon and the decrease of the adsorption and photocatalytic effects.

During the activation, a microwave of 300 W-700 W is used to radiate for 20~30 min.

In step 3, the activated carbon after activation is dried, and a solution of sodium borohydride is added dropwise at a low temperature to reduce the metal ions in the activated carbon, for example, ferrous ions is reduced to iron at zero valence. Preferably, the activation reaction is promoted by shaking at 100-140 rpm with a shaker. The concentration of sodium borohydride solution is 10 mmol/L~30 mmol/L.

The activated carbon is washed with distilled water and dried. After cooling to room temperature, the activated carbon after reduction is filled into a container, sealed, and heated at 180~680° C. in an oven for 10~60 minutes, and then cooled to room temperature to give functional biochar (that is, in situ self-reduction supported activated carbon).

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode. After the biochar is activated, the ash tar on its surface is removed, and the metal ions are exposed and then is reduced by sodium borohydride, thereby obtaining activated carbon loaded with heavy metals, which not only has inherent performances of activated carbon, such as regulating urban hydraulics, increasing soil fertility, maintaining nutrient and improving microbial habitat, but also has the functions of electric capacity and catalysis.

EXAMPLE

Example 1

As shown in FIG. 1, a device for controlling pollutants in metal mine water resources cycling utilization is provided, and the device is used to control the pollutants in basin water. An A/O tank, a nano-aeration tank and a multi-stage inflow constructed wetland are provided to connect in sequence. Basin water to be treated and algae are fed into the A/O tank, and then into the anoxic tank (dissolved oxygen content is 0.2~0.5 mg/L) and aerobic tank (dissolved oxygen content is 2~4 mg/L) in sequence. Denitrifying bacteria, nitrifying bacteria and phosphorus-accumulating bacteria are added to the A/O tank, then the treated supernatant from the aerobic tank (the COD is higher than 200 mg/L) is transported to the nano-aeration tank. Wherein, nano-bubble water with dissolved oxygen amount of 10~25 mg/L is fed into the nano-aeration tank, and the amount of dissolved oxygen in the nano-aeration tank is maintained at 4-6 mg/L, thus organic matters are further degraded in the aerobic environment of the nano-aeration tank. The basin water supernatant after treatment is fed into the multi-stage inflow constructed wetland through the nano-aeration tank.

There are four layers of fillers in the multi-stage inflow constructed wetland: the first layer of filler at 0-500 cm is a mixed filler of soil and functional biochar, wherein the mixing ratio is 3:7 and the particle size of the filler is 0.10-0.30 cm, and the wetland plants, Siberian iris and canna, are planted on it; the second layer of filler at 500-1000 cm is a mixed filler of soil, natural zeolite and limestone, wherein the mixing ratio is 1:2:0.5 and the particle size of the filler is 0.08-0.1 cm; the third layer of filler at 1000-1500 cm is added phosphorus-accumulating bacteria *pseudomona alcaligenes*, and the third layer of filler is a mixed filler of fly ash molecular sieve (Henan Mingze Environmental Protection Technology Co., Ltd., 13× molecular sieve), Flory diatomaceous earth and biochar, wherein the mixing ratio is 1:3:1 and the particle size of the filler is 0.05-0.08 cm; the fourth layer of filler at 1500-2000 cm is added anaerobic denitrifying bacteria and phosphorus-accumulating bacteria *pseudomona alcaligenes*, and the fourth layer of filler is a mixed filler of pebbles and biochar, wherein the mixing ratio is 1:1 and the particle size of the filler is 0.30-0.50 cm. Between the third and the fourth layers of filler is filled a polar polymer polyaniline film (obtained according to "Wang Hui. Electrochemical synthesis of polyaniline film photoelectric properties [J]. Journal of Xi'an Jiaotong University, 1999, (08): 107-108").

Example 2~18

Similar to Example 1, with the differences are shown in Table 1 below.

TABLE 1

| Example number | Differences from Example 1 (the substance and order related to the ratio is the same as those in Example 1) |
|---|---|
| Example 2 | The filler in first layer is soil |
| Example 3 | The mixing ratio in the first layer of filler is 1:1 |
| Example 4 | The particle size of the filler in first layer is 0.01~0.08 cm |
| Example 5 | The particle size of the filler in first layer is 5~30 mm |
| Example 6 | The second layer of filler is soil and limestone in original proportion |
| Example 7 | The second layer of filler is soil and natural zeolite in original proportion |
| Example 8 | The mixing ratio in the second layer of filler is 1:1:2 |
| Example 9 | The particle size of the filler in second layer is 0.01~0.05 cm |
| Example 10 | The particle size of the filler in second layer is 1~10 mm |
| Example 11 | The third layer of filler is fly ash molecular sieve and biochar in original proportion |
| Example 12 | The third layer of filler is fly ash molecular sieve and Flory diatomaceous earth in original proportion |
| Example 13 | The mixing ratio in the third layer of filler is 1:1:1 |
| Example 14 | The particle size of the filler in third layer is 0.005~0.03 cm |
| Example 15 | The filler of fourth layer is pebbles |
| Example 16 | The particle size of the filler in fourth layer is 0.001~0.30 cm |
| Example 17 | No phosphorus-accumulating bacteria is fed in the third and the fourth layers of filler |
| Example 18 | No anaerobic denitrifying bacteria is fed in the fourth layer of filler |

Experimental Example

The effects of the pollutant control methods in Examples 1~18 are evaluated by measuring the content of heavy metals, $COD_{Cr}$, total phosphorus, total nitrogen and pH in the water before and after the treatment. The results are shown in Table 2.

The water used for evaluation is collected from water of Qingshui River (Baoding City). $Pb(NO_3)_2$, $Zn(NO_3)_2$, $Na_3PO_4$ and $NaNO_3$ are added to the water, so that the concentration of Pb in the water is 1.31 mg/L, the concentration of Zn is 4.77 mg/L, and the total content of P is 11.25 mg/L, the total content of N is 28.18 mg/L, the concentration of $COD_{Cr}$ is 203 mg/L, and pH is 7.39. The treated water is fed into the water treatment device for a series of treatments with the inflowing rate of 2.5 L/min and the outflowing rate is 2.5 L/min. The treatment time is 24 h (about 10 h in the A/O tank, about 2 h in the nano-aeration tank and about 12 h in the multi-stage inflow constructed wetland), and the water quality is measured after 24 h.

TABLE 2

| Example number | Pb (µg/L) | Zn (mg/L) | $COD_{Cr}$ (mg/L) | Total P (mg/L) | Total N (mg/L) | pH |
|---|---|---|---|---|---|---|
| Example 1 | 81 | 1.54 | 65 | 1.63 | 3.50 | 7.30 |
| Example 2 | 106 | 1.92 | 151 | 2.01 | 3.71 | 7.32 |
| Example 3 | 86 | 1.65 | 73 | 1.77 | 3.88 | 7.32 |
| Example 4 | 56 | 1.47 | 54 | 2.22 | 4.01 | 6.90 |
| Example 5 | 94 | 1.71 | 89 | 1.71 | 3.67 | 7.28 |
| Example 6 | 217 | 2.72 | 69 | 1.80 | 3.40 | 7.40 |
| Example 7 | 39 | 0.54 | 75 | 2.44 | 4.26 | 6.22 |
| Example 8 | 138 | 2.37 | 67 | 1.75 | 3.61 | 7.42 |
| Example 9 | 37 | 0.96 | 74 | 2.24 | 4.08 | 7.33 |
| Example 10 | 90 | 1.83 | 66 | 1.99 | 3.77 | 7.31 |
| Example 11 | 93 | 1.60 | 68 | 2.29 | 4.02 | 7.27 |
| Example 12 | 113 | 1.48 | 58 | 1.97 | 3.68 | 7.41 |
| Example 13 | 100 | 1.66 | 78 | 2.17 | 3.84 | 7.34 |
| Example 14 | 69 | 1.40 | 57 | 1.88 | 3.57 | 7.37 |
| Example 15 | 116 | 1.72 | 62 | 1.91 | 3.67 | 7.31 |
| Example 16 | 109 | 1.55 | 65 | 2.03 | 3.86 | 7.34 |
| Example 17 | 90 | 1.64 | 81 | 2.84 | 4.04 | 7.50 |
| Example 18 | 76 | 1.58 | 86 | 2.37 | 4.96 | 7.40 |

As can be seen from Table 2, the decrease in the proportion of functional biochar in the first layer of filler mainly affects the adsorption of heavy metals and the reduction of COD values. When the size of the filler becomes smaller, it is beneficial to the adsorption of heavy metals, because it may affect the air entering the water, thereby reducing the ability of microorganisms to dephosphorize and denitrify. When the size of the filler becomes larger, the dephosphorization and the denitrification of microorganisms are promoted, thus the content of phosphorus and nitrogen decreases, but it has certain adverse effect on heavy metal adsorption.

The decrease in the proportion of natural zeolite in the second layer of filler mainly affects the adsorption and fixation of heavy metals, which causing higher content of heavy metals in the treated system. The pH in the system is affected by the decrease in the proportion of limestone, and the efficiency of the dephosphorization and the denitrification of microorganisms is reduced, causing higher contents of total nitrogen and total phosphorus in the water. The decrease in the particle size of the filler can significantly improve the adsorption of heavy metals, but it is unfavorable for the regulation of COD, total nitrogen and total phosphorus due to the obstruction of gas flow.

In the third layer of filler, Flory diatomaceous earth is beneficial to microorganisms and its dephosphorization and denitrification, and thus the effect of dephosphorization and denitrification decreases as the proportion of Flory diatomaceous earth decreases. The removal of biochar with excellent adsorption performance has certain impact on the level of heavy metals. And the adsorption of heavy metals can be significantly improved by decreasing the particle size of filler.

In the fourth layer of filler, the level of heavy metals is slightly increased by replacing activated carbon with pebbles, since activated carbon has better adsorption to heavy metals than pebbles. The adsorption performance can be enhanced by decreasing the particle size of the filler, but close packing is not beneficial to the dephosphorization and the denitrification of microorganisms, therefore, the total phosphorus and total nitrogen levels increase slightly as the particle size of the filler in fourth layer decreases.

Anaerobic denitrifying bacteria and phosphorus-accumulating bacteria have the functions of denitrification and dephosphorization, respectively. For the above reason, the total nitrogen and total phosphorus in the water body are significantly increased when both of them are not added to the water.

It can be seen from the results in the examples that by using the device of the present invention to treat sewage, the high content of Pb is decreased to less than 0.1 mg/L, the high content of Zn is decreased to less than 2.0 mg/L, the $COD_{Cr}$ is decreased to less than 100 mg/L, the total P is decreased to less than 2.0 mg/L, the total N is decreased to less than 5.0 mg/L, and the pH is maintained at a neutral level, which meet the requirements of "GB5084-2005 National Standards for Farmland Irrigation Water Quality Standards".

In the description of the present invention, it should be noted that the orientation or positional relationship indicated by the terms "over", "under", "inner", "outer", "front" and "rear" is based on the working state of the present invention. and is only for the convenience of describing the present invention and simplifying the description, rather than indicating or implying that the device or element referred to must have a specific orientation, be constructed and operated in a specific orientation, and therefore cannot be construed as limiting the present invention.

The present invention has been described in detail with reference to specific embodiments and exemplary examples, but these descriptions should not be construed as limiting the present invention. Those skilled in the art should understand that, without departing from the spirit and scope of the present invention, various equivalent replacements, modifications, or improvements can be made to the technical solution and its implementation of the present invention, all of which fall within the scope of the present invention. The protection scope of the present invention is subject to the appended claims.

What is claimed is:

1. A device for controlling pollutants in metal mine water resources cycling utilization, wherein, the device includes a multi-stage inflow constructed wetland (3), in which four layers of filler are laid, and water distribution pipes (4) are buried at different height levels in the layers of filler for multi-stage inflow; wherein the four layers of filler include:
   a first layer of filler (31) is a mixed filler of soil and functional biochar, the mixing weight ratio is 3:(6-8), the particle size of the filler is 0.10-0.30 cm, in which heavy metals are adsorbed and organic matters are degraded;
   a second layer of filler (32) is a mixed filler of soil, natural zeolite and limestone, the mixing weight ratio is 1:(2-3):(0.5-1), the particle size of the filler is 0.08-0.1 cm, in which heavy metals are adsorbed and fixed;
   a third layer of filler (33) is a mixed filler of fly ash molecular sieve, Flory diatomaceous earth and biochar, the mixing weight ratio is 1:(3-4):(1-1.5), the particle size of the filler is 0.05-0.08 cm, in which heavy metals are adsorbed, and phosphorus-accumulating bacteria is added in this area to reduce the phosphorus content of basin water to be purified;
   a fourth layer of filler (34) is a mixed filler of pebbles and biochar, the mixing weight ratio is 1:(1-2), the particle size of the filler is 0.30-0.50 cm, in which heavy metals are adsorbed, and phosphorus-accumulating bacteria is allowed to dephosphorize in this area by constructing an anaerobic environment.

2. The device according to claim 1, characterized in that, a polar polymer film (7), optionally a polyaniline film, is filled between the third layer of filler (33) and the fourth layer of filler (34), so that anaerobic environment is formed in the area where the fourth layer of filler (34) is located;
   anaerobic denitrifying bacteria is added to the fourth layer of filler (34);
   phosphorus-accumulating bacteria is added to the fourth layer of filler (34).

3. The device according to claim 1, characterized in that, the water distribution pipes (4) are buried in the area from the first layer of filler (31) to the second layer of filler (32), and from the second layer of filler (32) the third layer of filler (33);
   the water distribution pipe (4) is bored PVC casing, and the diameter of the water distribution pipe (4) buried at different height levels in the filler layer gradually decreases from top to bottom, therefore the flow rate of the introduced basin water decreases from top to bottom.

4. The device according to claim 1, characterized in that, the multi-stage inflow constructed wetland (3) is provided with a water inlet and a water outlet on both sides along its length, and the water outlet is located at the bottom of the multi-stage inflow constructed wetland (3) to collect water from the fourth layer of filler (34);
   the bottom of the multi-stage inflow constructed wetland (3) is provided with a slope with i=0.1-0.5, so that the water purified by the filler layer is collected to the water outlet along the slope.

5. The device according to claim 1, characterized in that, a plurality of airway tubes (5) with vent holes on walls of the airway tubes are longitudinally inserted in the multi-stage inflow constructed wetland (3).

6. The device according to claim 1, characterized in that, wetland plants (6), optionally Siberian iris and canna, are planted in the multi-stage inflow constructed wetland (3);
   rhamnolipid or (poly)aspartic acid or a combination thereof, optionally the combination of rhamnolipid and aspartic acid, is added in the multi-stage inflow constructed wetland (3) during the growth process of wetland plants (6).

7. A method for controlling pollutants in metal mine water resources cycling utilization by using the control device according to claim 1, wherein the method includes:
   providing the multi-stage inflow constructed wetland (3) at a set distance from basin revetment,
   feeding basin water into the multi-stage inflow constructed wetland (3) and the four layers of fillers laid in the multi-stage inflow constructed wetland (3) through the water distribution pipe (4) buried at different height levels to degrade or remove the pollutants.

8. The method according to claim 7, characterized in that, the method further includes:
   providing an A/O tank (1) connected in sequence with the multi-stage inflow constructed wetland (3),
   adding basin water and aquatic plants in an anoxic tank (101) of the A/O tank (1) to acidify and digest in the anoxic environment, feeding them into an aerobic tank (102) to degrade organic matters after acidification in the aerobic environment, and then transporting supernatant to the multi-stage inflow constructed wetland (3).

9. The method according to claim 8, characterized in that, a nano-aeration tank (2) is built to connect with the multi-stage inflow constructed wetland (3) and the A/O tank (1) in sequence,
   liquid in the A/O tank (1) is transported to the nano-aeration tank (2) and is treated in an aerobic environment in the nano-aeration tank (2), thereafter the liquid is fed to the multi-stage inflow constructed wetland (3).

\* \* \* \* \*